United States Patent [19]

Huber et al.

[11] Patent Number: 5,212,579
[45] Date of Patent: May 18, 1993

[54] METHOD AND APPARATUS FOR COMMUNICATING AMPLITUDE MODULATED SIGNALS OVER AN OPTICAL COMMUNICATION PATH

[75] Inventors: David R. Huber, Warrington; Joseph B. Glaab, New Hope, both of Pa.

[73] Assignee: General Instrument Corporation, Hatboro, Pa.

[21] Appl. No.: 667,443

[22] Filed: Mar. 11, 1991

[51] Int. Cl.[5] .................. H04B 10/04; H04B 10/00
[52] U.S. Cl. .................................. 359/182; 359/145; 359/181
[58] Field of Search ............... 359/145, 146, 154, 167, 359/172, 182, 181; 455/3, 4, 5, 6, 45, 102, 110, 118; 381/3, 4, 14; 358/86; 370/69.1

[56] References Cited

U.S. PATENT DOCUMENTS

| | | | |
|---|---|---|---|
| 4,274,112 | 6/1981 | Leysieffer et al. | 340/825.85 |
| 4,561,119 | 12/1985 | Epworth | 359/185 |
| 4,768,186 | 8/1988 | Bodell | 359/182 |
| 4,891,694 | 2/1990 | Way | 359/167 |
| 4,916,532 | 4/1990 | Streck et al. | 358/83 |
| 4,924,473 | 5/1990 | Burgyan et al. | 372/31 |
| 4,959,862 | 9/1990 | Davidou et al. | 455/6 |

Primary Examiner—Edward L. Coles, Sr.
Assistant Examiner—R. Bacares
Attorney, Agent, or Firm—Barry R. Lipsitz

[57] ABSTRACT

A block of amplitude modulated television channel signals frequency modulates an optical communication path. In one embodiment, the AM modulated channel signals FM modulate an RF subcarrier which, in turn, is used to intensity modulate an optical carrier for transmission. Frequency modulation of the RF subcarrier by the amplitude modulated channel signals is advantageously performed at microwave frequencies. The FM modulated subcarrier signal is then converted down to a frequency range compatible with transmitter and receiver components used in the system. The frequency modulation and conversion can be performed by a pair of voltage controlled oscillators coupled in a push-pull mode of operation. The outputs of the oscillators are combined in a double balanced mixer to down convert the FM signal spectrum. In another embodiment, the optical frequency of an optical carrier is FM modulated by the block of AM signals. Receivers for the FM modulated band of AM channel signals are also disclosed.

7 Claims, 5 Drawing Sheets

METHOD AND APPARATUS FOR COMMUNICATING AMPLITUDE MODULATED SIGNALS OVER AN OPTICAL COMMUNICATION PATH

BACKGROUND OF THE INVENTION

The present invention relates to the communication of amplitude modulated (AM) signals over an optical communication path, and more particularly to the transmission of an amplitude modulated cable television spectrum over an optical fiber link.

Recently, there has been a growing interest in the development of analog optical communication systems. In comparison with digital systems, analog communication systems provide an efficient use of bandwidth. This is particularly useful in cable television (CATV) transmission system applications, where it is necessary to transmit a large number of video channels through an optical fiber. Compatibility with existing equipment is achieved by using the same amplitude modulated vestigial-sideband (AM-VSB) signal format for optical transmission that is in use for coaxial cable signal transmission.

The use of a television signal comprising AM-VSB video subcarriers is preferred in the distribution of cable television signals due to the compatibility of that format with NTSC television standards and the ability to provide an increased number of channels within a given bandwidth. An undesirable characteristic of AM-VSB transmission, however, is that it requires a much higher carrier-to-noise ratio (CNR) than other techniques, such as frequency modulation or digital transmission of video signals. Generally, a CNR of at least 40 dB is necessary to provide clear reception of AM-VSB television signals.

In order to transmit an information signal (e.g., a television signal) over an optical fiber, a light beam ("carrier") must be modulated with the information signal. Direct modulation of a laser providing the light source or external modulation of the laser beam are different approaches with respective advantages and disadvantages well known in the art. It is also known that with present technology, it is difficult to obtain semiconductor lasers that exhibit sufficient linearity and dynamic range for transmission of multiple channel amplitude modulated subcarrier video. Multi-channel CATV systems must provide on the order of 40 or more channels to remain competitive. A problem with multiple channel AM transmission is that the carrier-to-noise ratio and distortion product requirements of AM transmission are difficult to achieve in optical communication systems.

Frequency modulation (FM) has much lower CNR and distortion product requirements. Multiple channel video transmission has been demonstrated using individual subcarriers for each of a plurality of FM modulated video channels. This technique of FM subcarrier modulation for video distribution is costly, however, since each channel requires its own modulator at the transmitter and demodulator at the receiver. Further, in order to achieve compatibility with existing cable systems, the recovered video in such an FM transmission scheme must be frequency translated to the proper television channel allocation. This requires a complex system that uses a large number of components.

It would be advantageous to provide a method and apparatus that takes advantage of the lower channel CNR and distortion product requirements of FM transmission, while maintaining the compatibility advantages of AM signal distribution. It would be further advantageous to provide a receiver for receiving signals communicated using such a technique. The present invention provides such a method and apparatus.

SUMMARY OF THE INVENTION

In accordance with the present invention, a method is provided for transmitting communication signals over an optical communication path. A block of conventional amplitude modulated ("AM") channel signals is used to frequency modulate an RF subcarrier. An optical carrier is then modulated by the frequency modulated subcarrier, and transmitted over an optical communication path such as an optical fiber. In a first embodiment, intensity modulation is used to modulate the optical carrier with the frequency modulated subcarrier containing the block of AM signals.

In order to facilitate signal processing, the frequency modulated RF subcarrier is converted to an appropriate frequency range for modulation of the optical carrier. Thus, for example, the frequency modulation of the RF subcarrier by the band of amplitude modulated channel signals can occur in the microwave frequency range, and then the subcarrier can be converted down to a lower frequency range compatible with the optical system components such as an optical transmitter and optical receivers.

At a receiver used in connection with the first embodiment, the intensity modulated optical carrier is received from the optical communication path. The frequency modulated RF carrier is recovered from the received optical carrier and, if necessary, converted to an appropriate frequency range for demodulation to recover the block of AM channel signals. The recovered block of signals is then available for input to a television receiver or other communication apparatus for demodulation of a selected AM channel signal.

Apparatus for transmitting communication signals in the first embodiment includes means for frequency modulating an RF subcarrier by the block of amplitude modulated channel signals, means for modulating an optical carrier with the RF subcarrier, and means for transmitting the modulated optical carrier over an optical communication path such as an optical fiber. Converting means convert the frequency modulated RF subcarrier to an appropriate frequency range for intensity modulation of the optical carrier. The frequency modulating and converting means can comprise a pair of voltage controlled oscillators coupled in a push-pull mode of operation. The block of amplitude modulated channel signals is input to the pair of oscillators, and double balanced mixer means coupled to the outputs of the oscillators provide the converted frequency modulated RF signal spectrum. In order to improve the linearity of the frequency modulation, the voltage controlled oscillators can operate in the microwave frequency range, where the block of amplitude modulated channel signals only occupies a small fraction of the approximately 20 GHz carrier.

Receiver apparatus in accordance with the first embodiment comprises means for receiving, from an optical transmission path, an intensity modulated optical carrier containing an RF subcarrier that has been frequency modulated by a block of AM channel signals. Means are provided for recovering the frequency modulated RF subcarrier from the optical carrier, and for FM demodulating the subcarrier to recover the block of amplitude modulated channel signals. Means coupled between the recovering means and the FM demodulating means can be provided for converting the recovered frequency modulatedsubcarrier to an appropriate frequency range for demodulation. Means are also provided for supplying the recovered amplitude modulated channel signals to a television set or the like for reproduction.

In a second embodiment, a block of AM channel signals is used to modulate the optical frequency of an optical carrier. The optical carrier can be referenced to an absolute optical frequency. This may be necessary for the proper operation of a discriminator used at the receiver for the signals. Receiver apparatus for the optical frequency modulated signals in the second embodiment comprises an optical FM discriminator for recovering the block of amplitude modulated channel signals from the received optical carrier and outputting a corresponding intensity modulated optical signal. Means are also provided in the receiver for demodulating the amplitude modulated channel signals which can comprise, for example, video and audio information.

DETAILED DESCRIPTION OF THE INVENTION

The present invention takes advantage of the low carrier-to-noise ratio and distortion product requirements of FM transmission by FM modulating an RF subcarrier by a block of conventional AM channel signals for subsequent transmission on an optical carrier via an optical communication path. The optical carrier can be provided by a laser having modest laser link linearity and CNR requirements for FM transmission. For example, a carrier-to-noise ratio of about 18 dB is sufficient for the FM transmission disclosed herein. Composite second and third order distortion products need only be about 20 dBc. This compares quite favorably with the 40 dB or so CNR required for AM transmission.

The present invention is illustrated in connection with a fiber optic cable television system. Those skilled in the art will appreciate that the invention is also applicable to other optical communication networks.

Figure 1:
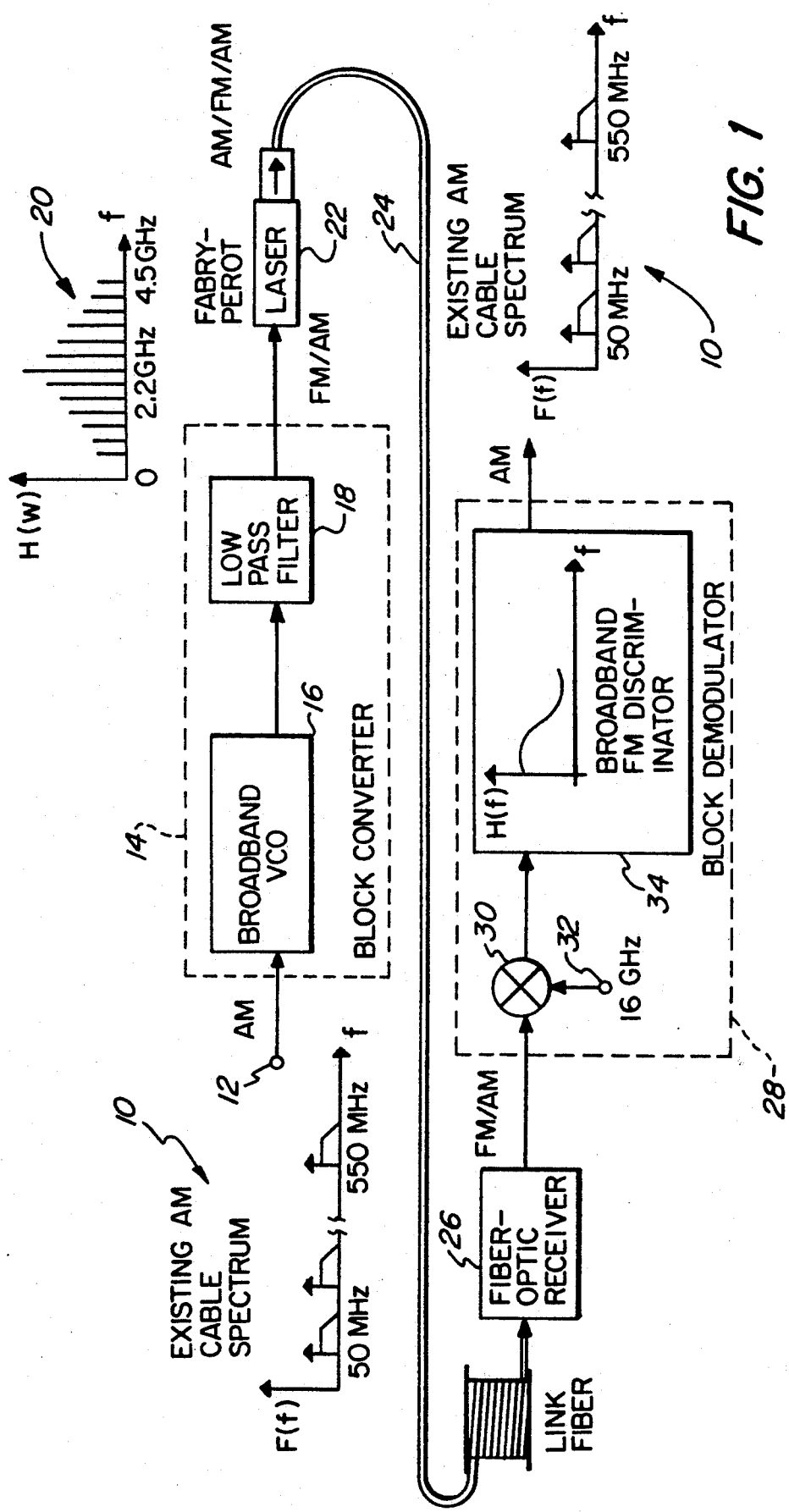
FIG. 1 is a block diagram illustrating a system in accordance with the present invention.

A first embodiment of the invention is illustrated in FIGS. 1 to 4. As shown in FIG. 1, an existing AM cable television spectrum 10 includes individual channel signals in six MHz allocations from about 50 MHz to about 550 MHz. Extended bands up to about 1 GHz are contemplated in the future. The existing spectrum 10 is input at a terminal 12 to a block converter 14. In accordance with the present invention, the block converter 14 comprises a broadband VCO 16 for frequency modulating an RF subcarrier, for example at 2.2 GHz, by the AM cable spectrum. Frequency modulation by the existing AM cable spectrum is advantageously performed at a frequency in the microwave range, where the bandwidth of the block of television carriers is small compared to the operating frequency of the voltage controlled oscillator. The FM modulated subcarrier is then filtered by a low pass filter 18, and output from block converter 14 to directly modulate a laser 22. A Fabry-Perot or distributed feedback ("DFB") or Quantum Well laser can be used, depending on the requirements of the communication system and the optical fiber link constraints. Those skilled in the art will appreciate that external modulation or any other type of intensity modulation for the optical signal can also be used.

In the embodiment illustrated in FIG. 1, Fabry-Perot laser 22 is intensity modulated by the RF subcarrier containing spectrum 20. This produces an intensity modulated optical carrier containing the block of television channel signals, for communication via a link fiber 24 to a fiber optic receiver 26. The optical carrier output from laser 22 therefore comprises the original AM cable spectrum that has been FM modulated in the radio frequency domain, for transmission as an intensity modulated signal over an optical communication path. The intensity modulated signal is referred to herein as an optical-AM/RF-FM/RF-AM, or simply "AM/FM/AM" signal.

Fiber optic receiver 26 is a conventional device that receives the optical carrier and recovers the intensity modulated information, which in this case is the FM modulated RF subcarrier containing the block of AM channel signals (FM/AM). The recovered information is input to a block demodulator generally designated 28, that comprises a mixer 30 for receiving a local oscillator frequency at terminal 32 to upconvert the recovered FM/AM signal, so that the original AM cable spectrum can be retrieved in a broadband FM discriminator 34. Upconversion of the recovered FM/AM signal is particularly advantageous if a tuned circuit discriminator is used to recover the AM spectrum. The recovered AM cable spectrum 10 is then output from the block demodulator.

Figure 2:
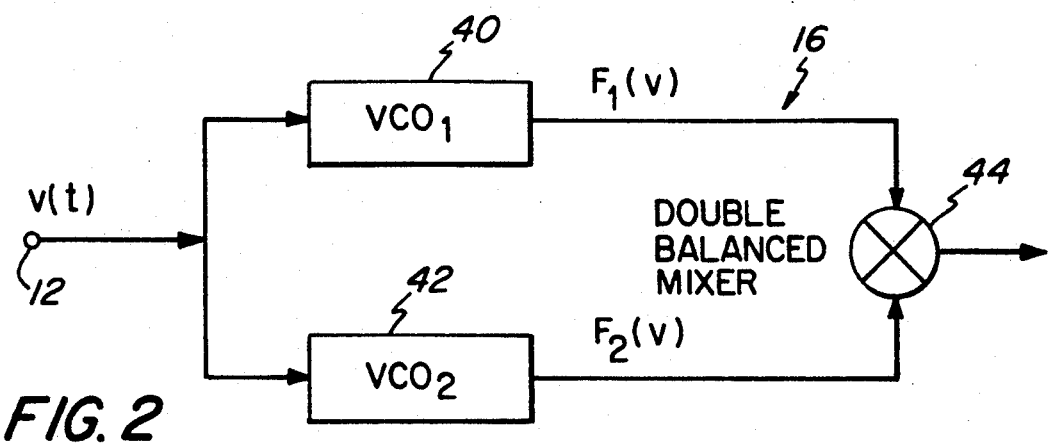
FIG. 2 is a block diagram illustrating a preferred embodiment of the broadband VCO used in the block converter of FIG. 1.

One embodiment for broa-dband VCO 16 is illustrated in the block diagram of FIG. 2. In this embodiment, a pair of voltage controlled oscillators (VCO) 40, 42 are coupled in a push-pull mode of operation. The VCOs operate at a center frequency of about 21 GHz, where they provide acceptable linearity to enable the block of AM signals input at terminal 12 to modulate the subcarrier produced by the VCOs. The 500 MHz bandwidth of the AM cable spectrum 10 is easily accommodated at the VCO operating frequency of about 21 GHz.

The outputs of VCO 40 and VCO 42 are combined, in a double balanced mixer 44, that down converts the FM modulated RF subcarrier to a frequency range that is compatible with the optical transmitters and receivers in the communication system. The resultant RF subcarrier is used to directly modulate laser 22. In operation, the FM modulated subcarriers output from VCOs 40, 42 at the 21 GHz microwave carrier frequency are heterodyned by mixer 4 to produce the signal spectrum 20 illustrated in FIG. 1, having a center frequency of about 2.2 GHz. Low pass filter 18 removes any higher frequency components from the spectrum output by broadband VCO 16.

Figure 3:
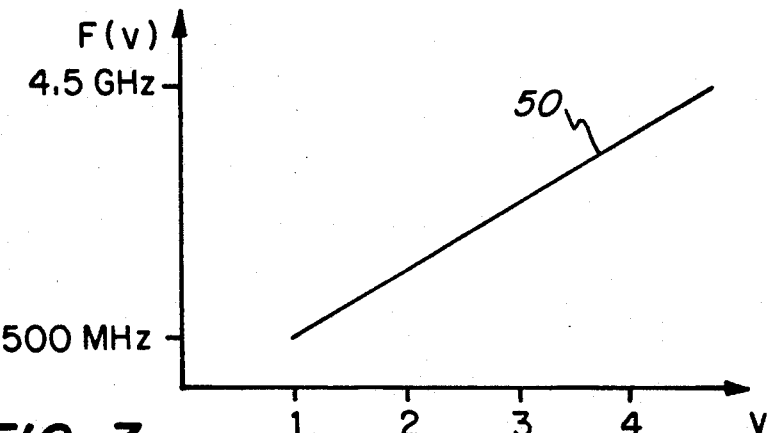
FIG. 3 is a graph illustrating the linear operation of the broadband VCO of FIG. 2.
Figure 4:
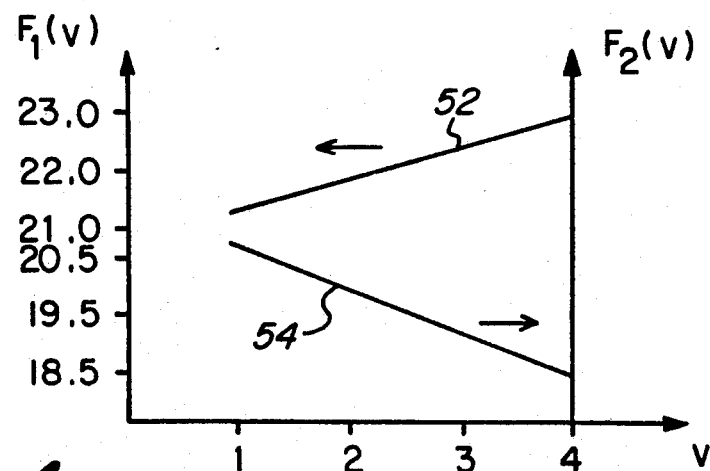
FIG. 4 is an idealized transfer function for the broadband VCO of FIG. 2.

FIG. 3 illustrates the linear relationship 50 between input voltage and output frequency at the output of double balanced mixer 44. FIG. 4 illustrates an idealized transfer characteristic for the push-pull implementation of VCOs 40, 42. Curve 52 illustrates the deviation above the center frequency as the input voltage is varied. Curve 54 illustrates the deviation below the center frequency with a variation in input voltage.

At the receiver, the block of amplitude modulated channel signals is recovered by a broadband FM discriminator 34 (FIG. 1). This discriminator can comprise any known type of discriminator, such as a simple low pass filter that discriminates at its transition. Alternately, a double balanced VCO structure similar to broadband VCO 16 could be used for FM discrimination at the receiver. Other known radio frequency FM discriminators could also be used.

Figure 5:
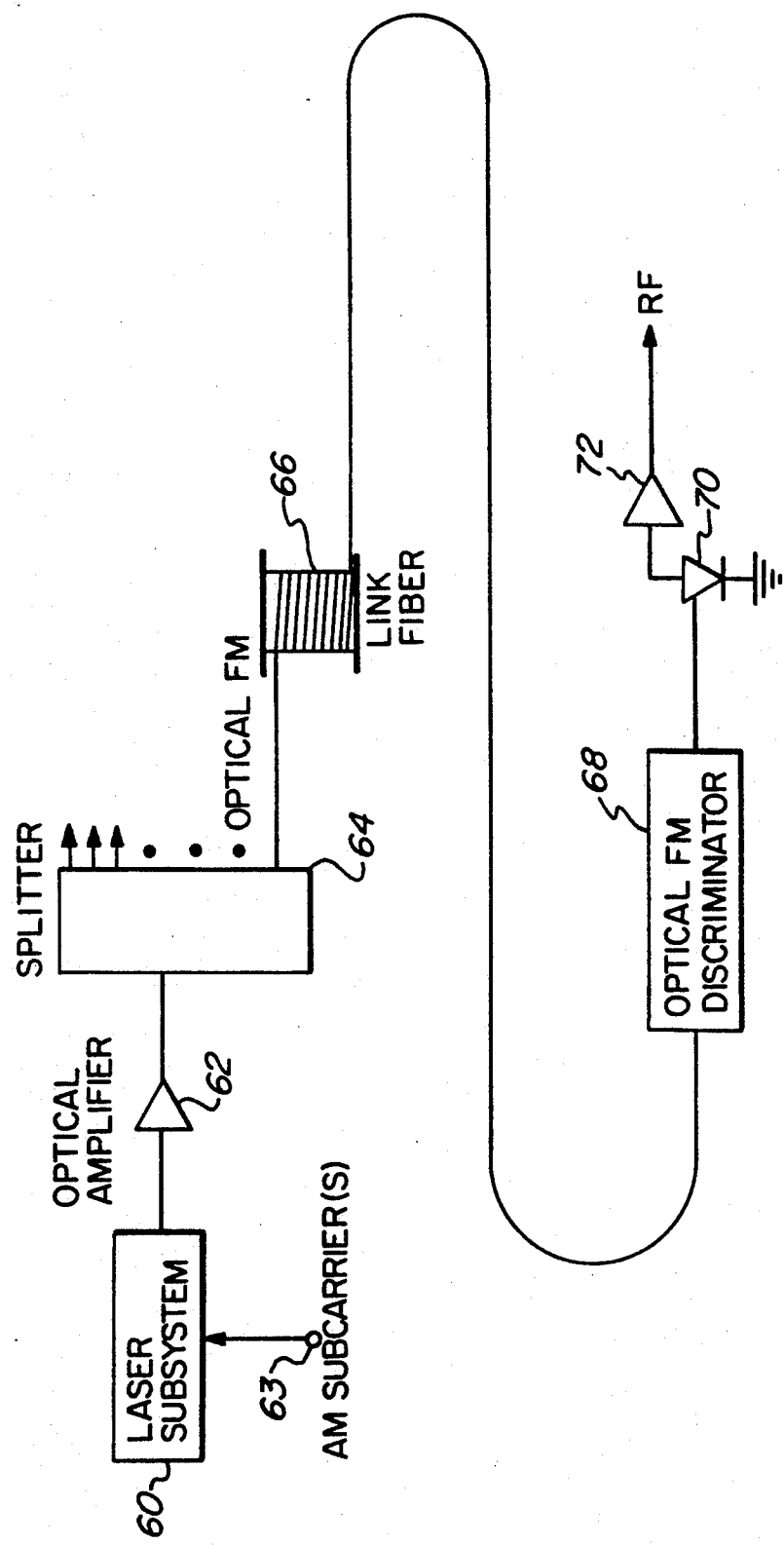
FIG. 5 is a block diagram of another embodiment of the present invention wherein the optical frequency of an optical carrier is modulated by a block of AM subcarriers.

Another embodiment of the invention is illustrated in FIGS. 5-10. In this embodiment, a block of AM subcarrier (e.g., video) information is distributed on optical fiber using optical frequency modulation. FIG. 5 illustrates a configuration in which a laser subsystem 60 provides the optical carrier. The carrier output from laser subsystem 60 is optically frequency modulated by a block of AM subcarriers 120 input at terminal 63. An optical amplifier 62 amplifies the frequency modulated optical carrier for input to a splitter 64. Each output of splitter 64 can be coupled to a different communication path in an optical fiber cable television communication network or the like. In the path illustrated in FIG. 5, the optically FM modulated carrier is transmitted over link fiber 66 to an optical discriminator 68 that recovers the AM subcarrier(s) from the optical carrier. The optical discriminator can utilize any of the known optical discriminator technologies, such as optical delay lines, optical filters, an unbalanced RF interferometer, wave division multiplexed gratings and/or dielectric films. The output of optical discriminator 68 is detected and converted to the electrical domain by a conventional photodetector 70. The resultant electrical signal is amplified by an RF amplifier 72 and output for demodulation of the individual AM subcarrier(s) in an conventional manner.

Figure 9:
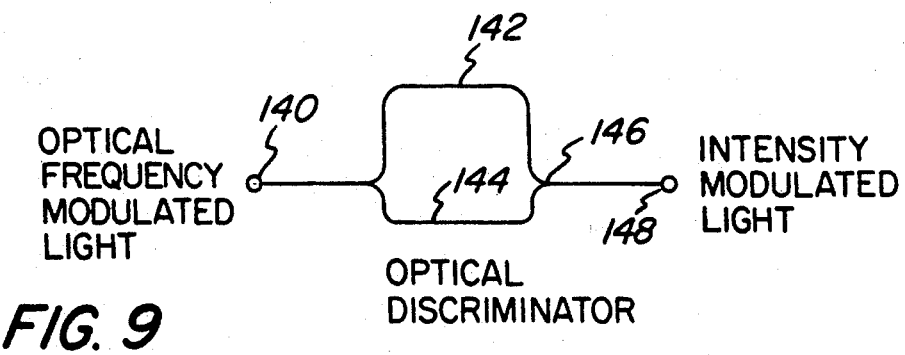
FIG. 9 is a schematic diagram of an unbalanced interferometer that can be used as the optical discriminator in the embodiment of FIG. 5.

An example of an optical discriminator that can be used in the embodiment illustrated in FIG. 5 is the Mach-Zehnder interferometer optical frequency discriminator illustrated in FIG. 9. The optical frequency modulated light from link fiber 66 is input to a terminal 140, and split into two paths 142 and 144 of unequal length. Since path 142 is longer than path 144, a small delay will be introduced into the optical signal carried by path 142 with respect to that carried by path 144 The paths are combined in an interferometer 146 and the resultant output signal at terminal 148 comprises intensity modulated light carrying the AM subcarrier information. If the discriminator chosen operates off of an absolute frequency, it will be necessary to provide the laser at the transmitter with an absolute frequency reference to prevent any drift of the optical carrier frequency.

Figure 10:
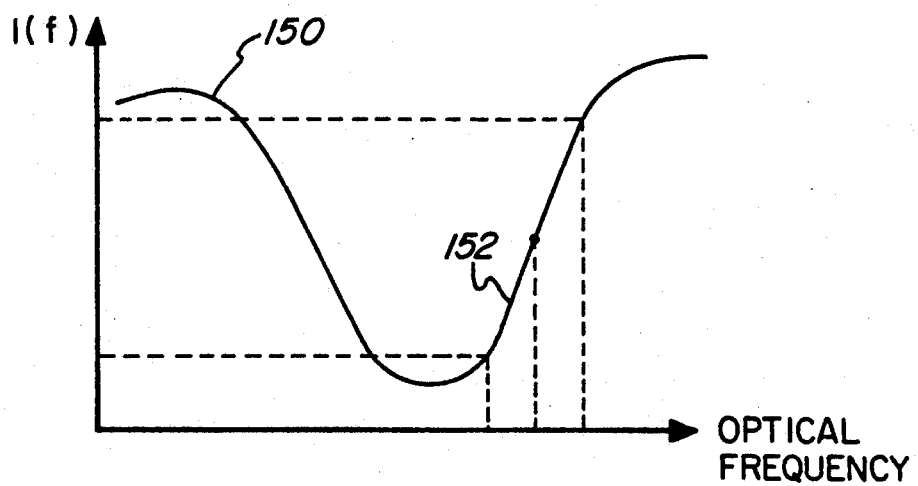
FIG. 10 is a graph of the transfer characteristic illustrating a linear range of operation of the optical discriminator of FIG. 9.

FIG. 10 illustrates a transfer characteristic 150 for the optical discriminator of FIG. 9. As illustrated at 152, the transfer characteristic includes a fairly linear region at which the optical discriminator can be operated. A further discussion of a Mach-Zehnder interferometer device can be found in B. H. Verbeek, et al, "Integrated Four Channel Mach-Zehnder Multi/Demultiplexer Fabricated with Phosphorus Doped $SiO_2$ Waveguides on Si", *IEEE Lightwave Technology*, LT-6, p. 1011, 1988. Other optically dispersive elements such as a Fabry-Perot interferometer could also be utilized as an optical discriminator.

Figure 6:
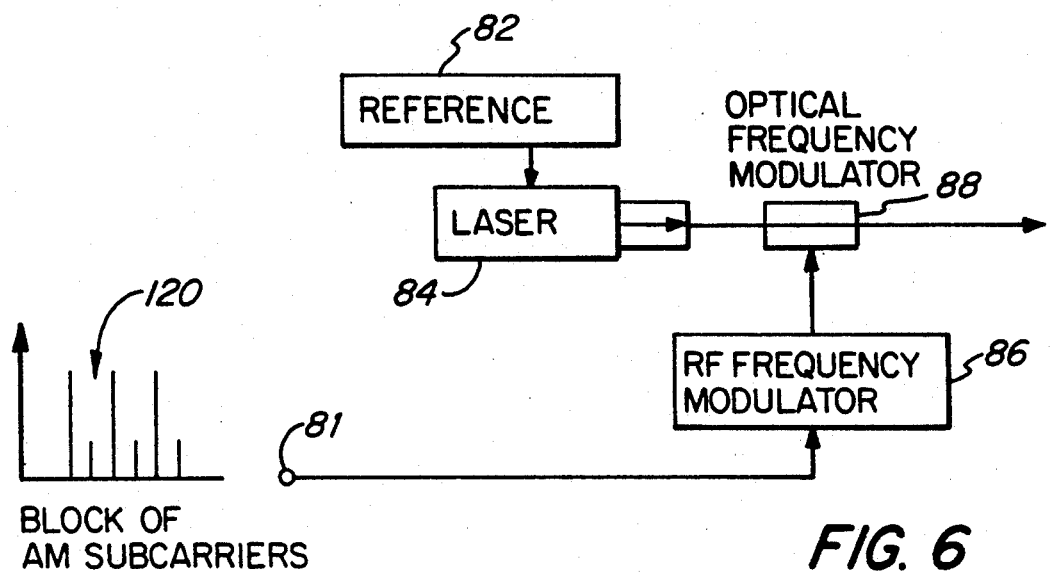
FIG. 6 is a block diagram illustrating the external optical frequency modulation of an optical carrier with a block of AM subcarriers.

FIG. 6 illustrates a configuration for laser subsystem 60 of FIG. 5. The block of AM subcarriers 120 is input at terminal 81 to an RF frequency modulator 86, such as the push-pull VCO arrangement 16 illustrated in FIG. 2. A laser 84 provides an optical carrier. If required by the FM discriminators at the receivers, laser 84 will be provided with an absolute frequency reference 82 to maintain the laser output center frequency at a fixed point. An optical frequency modulator 88 modulates the optical carrier with the RF frequency modulated subcarrier output from modulator 86. As a result, the optical carrier will carry the block of AM subcarriers 120 within the optical frequency modulation.

External optical frequency modulator 88 translates the RF modulation from modulator 86 to the optical domain. The optical frequency modulator can be implemented using either the acousto-optic or magneto-optic effect. Examples of such optical frequency modulators are described in the literature. For example, C. S. Tsai and D. Young, "Wideband Guided-Light Beam Deflection and RF Spectral Analysis Using Magnetostatic Forward Volume Waves", *Integrated and Guided-Wave Optics Topical Meeting*, (IGWO), Houston, Tex., Feb. 6-8, 1989, MBB3-1, pp 29-31 point out a magneto-optic interaction technology that can translate a broadband RF frequency modulated signal to the optical domain. C. S. Tsai and Z. Y. Cheng, "A Novel Integrated Acoustooptic Frequency Shifter", *IGWO*, Houston, Tex., Feb. 6-8, 1989, TuAA5-1, pp. 142-145 disclose an acoustooptic interaction technology that can be used for the same purpose. C. S. Tsai, T. Q. Vu, and J. A. Norris, "Formation of Planar Waveguide Lenses and Lens Arrays in GaAs Using Ion Milling", *IGWO*, Houston, Tex., Feb. 6-8, 1989, MDD4-1, pp. 76-79, discuss a technology for coupling light into and out of such modulators. The lenses disclosed can be integrated with the modulators.

When using the modulators described in the above-noted Tsai et al references, it is necessary to first convert the AM subcarrier information to wideband FM to realize the FM signal processing gain, i.e., the desired increase in delivered CNR. This conversion can be done in the RF domain with conventional electronics.

Figure 7:
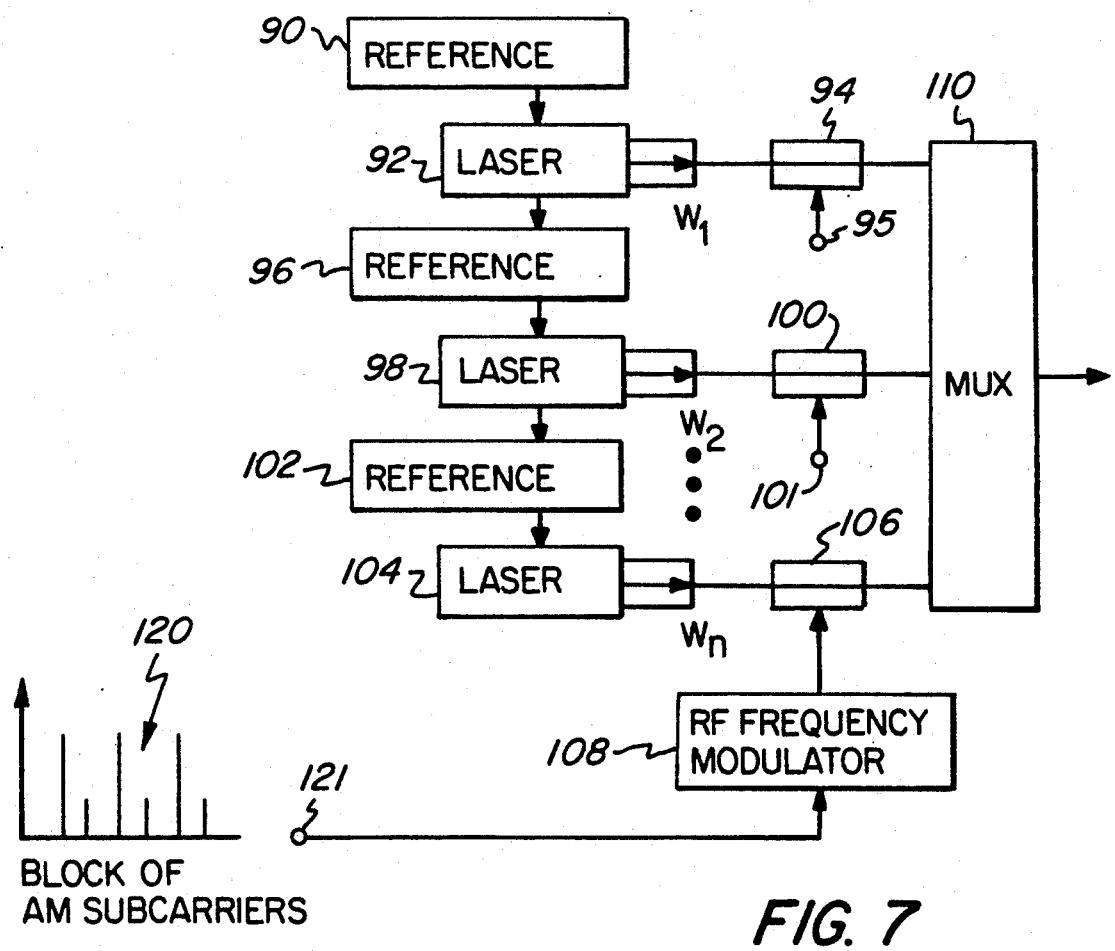
FIG. 7 is a block diagram illustrating the external optical frequency modulation of a plurality of optical carriers with different blocks of AM subcarriers.

FIG. 7 illustrates apparatus for providing an optical frequency modulated carrier that carries a plurality of different blocks of AM subcarriers 120. The blocks of AM subcarriers are each input at a terminal 121 to a different RF frequency modulator, only one such modulator 108 being illustrated in FIG. 7. The outputs of other RF frequency modulators (not shown) are coupled to terminals 95 and 101, each accommodating a different block of subcarriers.

Each block of AM subcarriers is optically modulated on a separate optical carrier provided by a corresponding laser. By providing separate laser subsystems for different blocks of subcarriers, the overall channel capacity of the optical transmission system can be increased. For example, laser 92, having a first optical frequency $w_1$ (which can be held constant by absolute optical frequency reference 90) outputs an optical carrier for modulation by an optical frequency modulator 94. Laser 98 provides a second output having a fixed frequency $w_2$, which can be held constant by absolute optical frequency reference 96 if required by the optical discriminator at the receiver. This optical carrier is modulated by optical frequency modulator 100. Finally, laser 104 provides an optical output having a frequency $w_n$, (held constant, if necessary, by absolute optical frequency reference 102), for modulation by optical frequency modulator 106. Each of the modulated carriers from lasers 92, 98, 104 is input to a multiplexer 110 where the carriers are combined into a single optical signal for transmission.

The optical multiplexer 110 (and a corresponding optical demultiplexer at the receiver) can be provided using any of a number of known technologies. In the simplest embodiment, the multiplexer can comprise a wavelength insensitive fiber combiner. Micro-optic gratings, dichroic multilayer dielectric filters, or unbalanced Mach-Zehnder interferometers can all provide multiplexer and demultiplexer functions. See, for example, M. Kawachi, "Wavelength Division Multiplexing Integrated Waveguide Components on Si Substrates", *Conference on Laser and Electro-optics*, Baltimore, Md., Apr. 24–28, 1989, FG5.

Optical amplifiers can also be provided in the embodiment illustrated in FIG. 7. If the optical frequency modulator has only a very small residual amplitude modulation, a semiconductor optical amplifier can be used. Erbium fiber amplifiers can also be used, and are much more resistant to amplitude induced crosstalk. A number of optical amplifiers can be cascaded in the fiber distribution system to increase the total loss budget available and extend the signal transmission.

Figure 8:
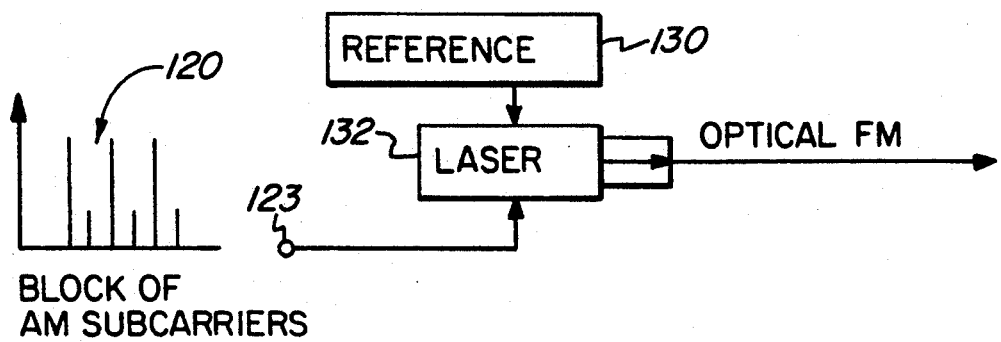
FIG. 8 is a block diagram illustrating the direct optical frequency modulation of an optical carrier with a block of AM subcarriers.

FIG. 8 illustrates another method for providing optical frequency modulation of an optical carrier with a block of AM subcarriers. In this embodiment, the block of AM subcarriers 120 is input to a terminal 123 to directly modulate the injection current of a semiconductor laser 132. Changes in the injection current cause an optical frequency chirp in the laser. The resultant FM response can be very linear. See, for example, Y. Yoshikuni and G. Motosugi, "Multielectrode Distributed Feedback Laser for Pure Frequency Modulation and Chirping Suppressed Amplitude Modulation", *Journal of Lightwave Technology*, Vol. LT-5, No. 4, April 1987.

As with the other embodiments, laser 132 can be absolutely referenced in the optical frequency domain by an absolute optical frequency reference 130. This is necessary where the optical frequency multiplexers, demultiplexers and optical frequency discriminators of the system operate at specific optical frequencies. Those skilled in the art will appreciate that the absolute optical frequency reference can be provided by any number of means. For example, the opto-galvano effect or a gas cell may be utilized. See, for example, Y. C. Chung, P. D. Tkach, "Cold-Start 1.5 μm FSK Heterodyne Detection Experiment", *Optical Fiber Communications Conference*, Houston, Tex., Feb. 6–9, 1989, TUI5 and M. W. Maeda, R. E. Wagner, "Frequency Identification and Stabilization of Packaged DFB Laser in the 1.5 μm Region", *Optical Fiber Communications Conference*, Houston, Tex., Feb. 6–9, 1989, TUI4.

It should now be appreciated that the present invention provides a system for transmitting blocks of amplitude modulated video subcarriers over an optical communication path, without the disadvantages of conventional AM optical fiber transmission. The linearity of the optical communication path is not as critical in the present system, in which the AM signals are communicated via frequency modulation, as it would be for AM transmission. Linearity in the frequency modulation process in the electrical domain is provided by operating the FM modulator at microwave frequencies. A double balanced voltage controlled oscillator embodiment increases linearity of the modulation process, and also doubles the usable frequency deviation when compared to a single VCO. Down conversion is provided by combining the outputs of the VCOs in a double balanced mixer.

Although the invention has been described in connection with various preferred embodiments thereof, those skilled in the art will appreciate that numerous adaptations and modifications may be made thereto, without departing from the spirit and scope of the invention as set forth in the claims.

What is claimed is:

1. Apparatus for transmitting communication signals over an optical communication path comprising:
   first means for frequency modulating a carrier by a block of amplitude modulated channel signals to provide an FM modulated RF subcarrier containing said block of channel signals and for converting said FM modulated RF subcarrier to an appropriate frequency range for modulation of an optical carrier, said first means including:
   a pair of voltage controlled oscillators coupled in a push-pull mode of operation,
   means for inputting said block of amplitude modulated channel signals to said pair of oscillators, and
   double balanced mixer means coupled to the outputs of said oscillators for providing said converted RF subcarrier; and
   second means for modulating said optical carrier by said converted FM modulated RF subcarrier for transmission over an optical communication path to communicate a plurality of AM channel signals contained in said block on a single communication channel.

2. Apparatus in accordance with claim 25 wherein said second means comprise:
   means for frequency modulating said optical carrier by said RF subcarrier for transmission over said communication path.

3. Apparatus in accordance with claim 25 wherein said voltage controlled oscillators operate in the microwave frequency range.

4. Apparatus in accordance with claim 2 wherein each of a plurality of different optical carriers is frequency modulated by a different FM modulated RF subcarrier carrying a different block of amplitude modulated channel signals, said apparatus further comprising:

means for combining said plurality of frequency modulated optical carriers for transmission over said optical communication path.

5. Receiver apparatus for recovering a block of amplitude modulated channel signals from the modulated optical carrier transmitted over said communication path from the apparatus of claim 1, comprising:
   means for receiving said modulated optical carrier from a single channel allocation of said optical communication path;
   means for recovering said frequency modulated RF subcarrier from the optical carrier; and
   means for FM demodulating the recovered RF subcarrier to recover said block of amplitude modulated channel signals.

6. Apparatus in accordance with claim 5 further comprising:
   means coupled between said recovering means and said FM demodulating means for converting the recovered frequency modulated RF subcarrier to an appropriate frequency range for demodulation.

7. Apparatus in accordance with claim 1 wherein said second means comprise:
   means for intensity modulating said optical carrier by said RF subcarrier for transmission over said communication path.

* * * * *

UNITED STATES PATENT AND TRADEMARK OFFICE
CERTIFICATE OF CORRECTION

PATENT NO. : 5,212,579
DATED : May 18, 1993
INVENTOR(S) : Huber, et. al.

It is certified that error appears in the above-indentified patent and that said Letters Patent is hereby corrected as shown below:

Column 8, claim 2, line 1, "claim 25" should read -- claim 1 --.

Column 8, claim 3, line 1, "claim 25" should read -- claim 1 --.

Signed and Sealed this

First Day of February, 1994

Attest:

BRUCE LEHMAN

*Attesting Officer*     *Commissioner of Patents and Trademarks*